United States Patent
Camp, Jr.

(10) Patent No.: US 7,756,536 B2
(45) Date of Patent: Jul. 13, 2010

(54) DEVICE AND METHOD FOR PROVIDING AND DISPLAYING ANIMATED SMS MESSAGES

(75) Inventor: William O. Camp, Jr., Chapel Hill, NC (US)

(73) Assignee: Sony Ericsson Mobile Communications AB, Lund (SE)

(*) Notice: Subject to any disclaimer, the term of this patent is extended or adjusted under 35 U.S.C. 154(b) by 699 days.

(21) Appl. No.: 11/669,260

(22) Filed: Jan. 31, 2007

(65) Prior Publication Data

US 2008/0182566 A1    Jul. 31, 2008

(51) Int. Cl.
  *H04W 4/00* (2009.01)
(52) U.S. Cl. .................................. 455/466; 455/412.1
(58) Field of Classification Search ................ 455/66.1, 455/412.1, 412.2, 413, 414.1, 414.2, 414.3, 455/414.4, 415, 418, 420, 466, 517, 550.1, 455/566, 567; 345/473; 715/706, 763; 704/235, 704/260, 270.1
See application file for complete search history.

(56) References Cited

U.S. PATENT DOCUMENTS

| | | | | | |
|---|---|---|---|---|---|
| 5,903,723 | A | * | 5/1999 | Beck et al. | 709/200 |
| 5,978,805 | A | * | 11/1999 | Carson | 1/1 |
| 6,167,402 | A | * | 12/2000 | Yeager | 1/1 |
| 6,990,452 | B1 | * | 1/2006 | Ostermann et al. | 704/260 |
| 7,085,259 | B2 | * | 8/2006 | Wang et al. | 370/352 |
| 2004/0097221 | A1 | * | 5/2004 | Lee | 455/419 |
| 2004/0213458 | A1 | * | 10/2004 | Kanatsu | 382/181 |
| 2005/0021494 | A1 | * | 1/2005 | Wilkinson | 707/1 |
| 2005/0081150 | A1 | * | 4/2005 | Beardow | 715/531 |
| 2005/0116956 | A1 | * | 6/2005 | Beardow | 345/473 |
| 2005/0143108 | A1 | * | 6/2005 | Seo et al. | 455/466 |
| 2007/0180035 | A1 | * | 8/2007 | Liu et al. | 709/206 |

FOREIGN PATENT DOCUMENTS

| | | |
|---|---|---|
| EP | 1276301 A | 1/2003 |
| EP | 1523160 A | 4/2005 |
| EP | 1549031 A | 6/2005 |
| WO | 9719429 A | 5/1997 |
| WO | 9732439 A | 9/1997 |
| WO | 03039169 A | 5/2003 |

OTHER PUBLICATIONS

International Search Report dated Jan. 15, 2008.

* cited by examiner

*Primary Examiner*—Patrick N Edouard
*Assistant Examiner*—Anthony S Addy
(74) *Attorney, Agent, or Firm*—Harrity & Harrity, LLP

(57) ABSTRACT

A device and method of creating and displaying a short message service (SMS) message capable of attaching and displaying animated characteristics is disclosed. To create an animated SMS message the user responds to input prompts asking for: a mobile identification number that identifies the receiving party, an animation flag that determines whether the SMS message will have animation characteristics, a content pointer location that specifies the location of a content file resident on the receiving device, and the actual text of the SMS message. To display an animated SMS message the receiving device parses the SMS message to determine how to apply the desired animation characteristics. An animation flag is checked and the location of a content file on the receiving device is determined. The content file is retrieved and combined with the text of the SMS message and the combination is then animated according to the animation type specified.

29 Claims, 6 Drawing Sheets

DEVICE AND METHOD FOR PROVIDING AND DISPLAYING ANIMATED SMS MESSAGES

BACKGROUND OF THE INVENTION

Portable mobile communications devices such as mobile phones are becoming more sophisticated and include many new features and capabilities. Most portable mobile communications devices include the ability to send messages using the text or character based short message service (SMS). SMS is popular with service providers because it does not tax the mobile network infrastructure very much. It is popular with subscribers because it is a fast efficient and inexpensive means of communicating in short bursts. The drawback to SMS messaging is its lack of robustness. File attachments like pictures, audio files, or video clips significantly increase the cost to the subscriber and the load on the mobile infrastructure. If a desired content file were already resident on a receiving device, an SMS message application could take advantage of that knowledge and provide a means for utilizing the content file in such a way as not to increase the cost to the subscriber or the load on the mobile network. Standard SMS text messages could be created that would yield graphical effects on the receiving device thereby enhancing the user experience.

BRIEF SUMMARY OF THE INVENTION

In one embodiment, a method of creating, on a device, a text based short message service (SMS) message capable of attaching animated characteristics to the SMS message is disclosed. The method prompts the user to input data to be used in constructing the SMS message. The device receives user input providing a mobile identification number that identifies a receiving portable mobile communications device. The device sets an animation flag that determines whether the SMS message will have animation characteristics applied to it by the receiving portable mobile communications device. The user inputs and the device enters a content pointer location that specifies the location of a content file resident on the receiving portable mobile communications device. The user also enters and the device receives the text and/or characters to be associated with the SMS message. The device then constructs the SMS message using the input data. The device can also receive user input data providing an animation type parameter that specifies how the content file associated with the SMS message will be animated.

The animation type includes facial expressions. In addition, the text in the SMS message can, as an alternative to being displayed, also be translated into an audio signal that can then be synchronized to the animation with the mouth moving in synchronization with the audio. The SMS message can be made to control characteristics of the audio, via a set of parameters stored in the receiving phone along with the picture, so that the voice sounds like that of the person whose picture is being animated. The SMS message can also contain other instructions that tell the animation how to move the face, mouth, eyes, etc. The content file can be, inter alia, a picture, an emoticon, or an audio file.

The SMS message can be created and sent from a sending portable mobile communications device to a receiving portable mobile communications device over a mobile network. Or the SMS message can be created and sent from a computer device to a receiving portable mobile communications device over an Internet Protocol (IP) network that is communicable with a mobile network.

In another embodiment there is disclosed, on a portable mobile communications device, a method of displaying a text based short message service (SMS) message having animated characteristics associated with the SMS message. An SMS message is received from a mobile network. The received SMS message is then parsed to determine how to manipulate the message to apply the desired animation characteristics before being displayed. The parsing step determines whether the received SMS message has been associated with animation characteristics. And if so, determines the location of a content file on the portable mobile communications device that is to be associated with the received SMS message. The content file is then retrieved and combined with the text of the SMS message. The animation type is then applied to the combined text and content file to create an animated SMS message.

In still another embodiment there is disclosed a portable mobile communications device for creating and receiving a text based short message service (SMS) message capable of attaching and displaying animated characteristics associated with the SMS message. The portable mobile communications device includes an SMS application for composing, sending, receiving, and parsing an SMS message. An RF module is included for communicating with a mobile network to send and receive an SMS message. Content storage means store content files to be associated with an SMS message. An animation application applies animation characteristics to the content file associated with an SMS message. A processor executes the SMS application and animation application as well as facilitating operations with the other portable mobile communications device components. A display on the portable mobile communications device displays the animated SMS message.

DETAILED DESCRIPTION OF THE INVENTION

Figure 1:
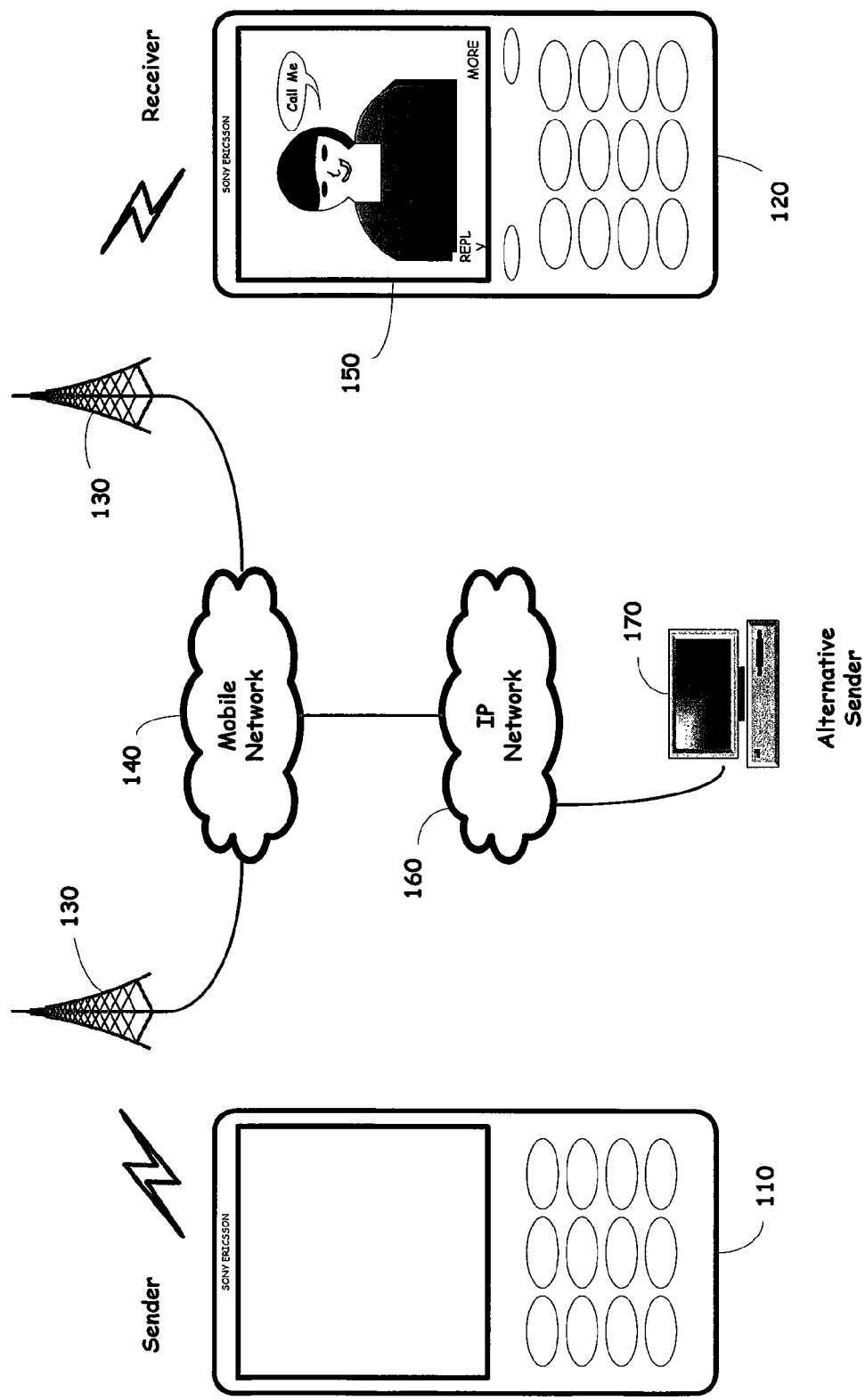
FIG. 1 is an illustration of components of a system for sending and receiving SMS messages between portable mobile communications devices.

FIG. 1 is an illustration of components of a system for sending and receiving SMS messages between portable mobile communications devices. A sending portable mobile communications device 110 is capable of communicating with a receiving portable mobile communications device 120 over a mobile network 140 by way of a basestation 130. The type of communication capable between the portable mobile communications devices 110, 120 can include both voice and data. The type of communication to be discussed herein is data communication, specifically short messaging service (SMS) communications which is more commonly known as text messaging. SMS messages are relatively short character based communications similar to e-mail but over a mobile phone network 140. File attachments are not allowed with SMS messages. If a file is attached (e.g., a picture or audio file) to a text message between two portable mobile communications devices 110, 120, it is typically referred to as a multi-media message (MMS).

SMS messages are intentionally constrained in length and limited to textual characters so as not to overly tax the mobile network infrastructure 140 and to provide a relatively easy basis for charging fees to users that take advantage of the service. The present invention provides a mechanism by which an SMS message can trigger a multi-media type response in the receiving portable mobile communications device 120 using only text. This is achieved by having the receiving portable mobile communications device 120 treat the text as instructions and parsing the text accordingly so that the instructions can be carried out.

The display 150 of the receiving portable mobile communications device 120 in FIG. 1 shows a picture of a person with a text 'callout' that is telling the user of the receiving portable mobile communications device 120 to call the sending user. Since FIG. 1 is static, picture animation of the display can not be illustrated but is possible. For instance, the mouth of the user could be made to move indicating speech.

The sending portable mobile communications device 110 sent an SMS message to the receiving portable mobile communications device 120 with the only text being the words "Call Me". The SMS message was constructed with additional fields of data that, when parsed by the receiving portable mobile communications device 120, cause the picture to be displayed and the text to be shown in the callout bubble. Any animation of the picture would also be included in the SMS message.

SMS messages can also be sent from computers having Internet Access over an IP network 160 to a receiving portable mobile communications device 120 since the mobile network 140 can communicate with an IP network 170.

Figure 2:
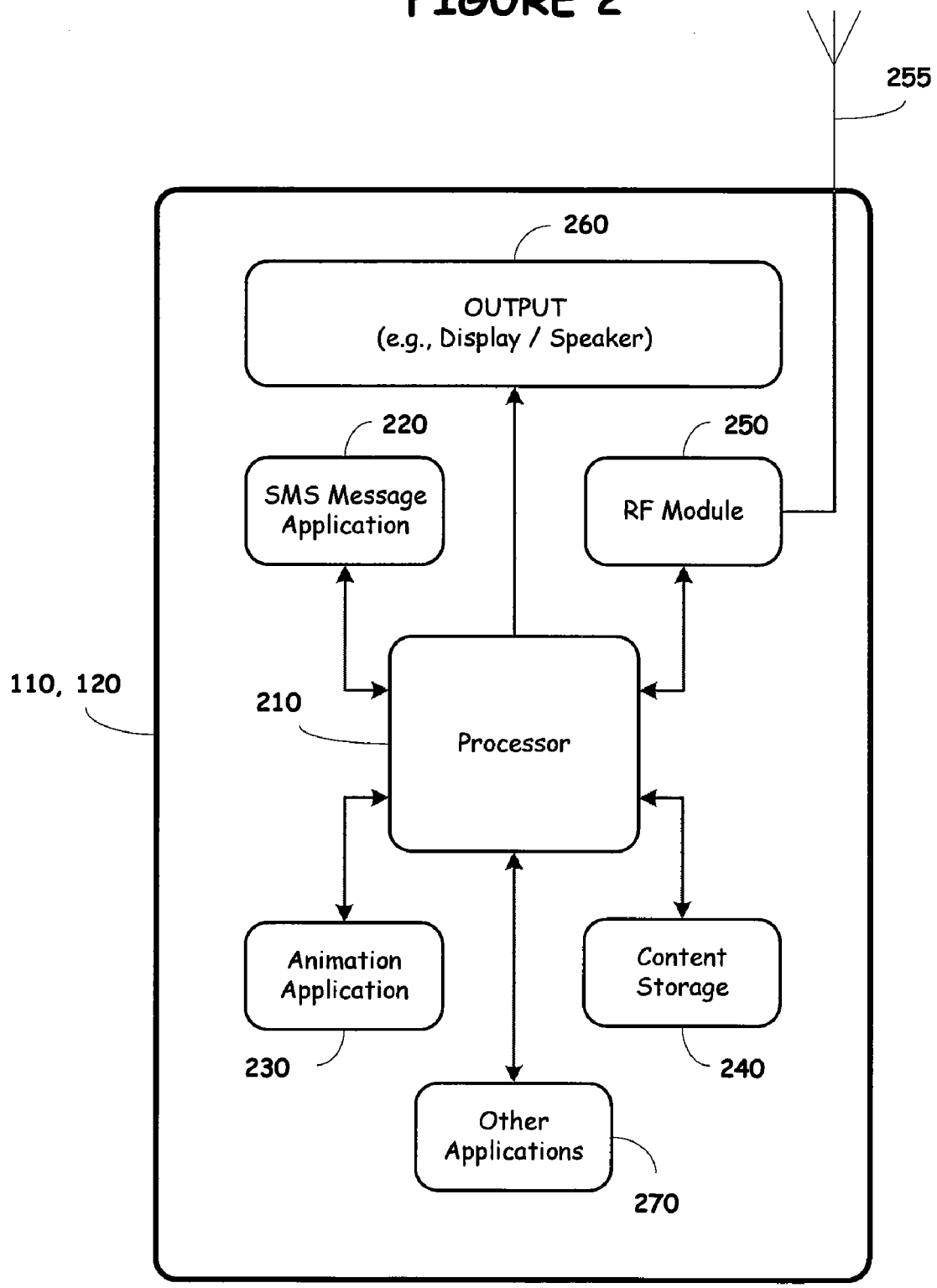
FIG. 2 is an illustration of a portable mobile communications device capable of sending and receiving SMS messages that can spur animation characteristics in the receiving device.

FIG. 2 is an illustration of a portable mobile communications device 110, 120 capable of sending and receiving SMS messages that can spur animation characteristics in the receiving device. At the core of the portable mobile communications device 110, 120 is a processor 210. The processor 210 is responsible for executing a myriad of applications resident in the portable mobile communications device 110, 120. In fact, it is not uncommon to employ more than one processor 210 in a portable mobile communications device 110, 120 and while the illustration in FIG. 2 indicates only a single processor 210 that is for ease of illustration only.

The processor 210 is coupled with an SMS message application 220, an animation application 230, a content storage device (or devices) 240, an RF module 250, output means (display, speaker) 260, and other applications 270. The RF module is also coupled with an antenna 255 to facilitate RF communications with the mobile network.

The SMS application 220 is invoked when the user wants to send an SMS message or when an SMS message is received. The SMS application 220 provides the user an interface to help compose and send outgoing SMS messages as well as to receive, view, respond to, or otherwise manipulate incoming SMS messages including recognizing when a received SMS contains special animation characteristics.

The animation application 230 is coupled with the SMS application 220 by way of the processor 210. The animation application 230 is capable of manipulating a still picture so that it can be displayed with animation effects on the display of a portable mobile communications device. This feature/technology is implemented using Sony's proprietary Motion-Portrait™ application, for instance. The SMS application 220 is capable of incorporating an animation with an SMS text message.

The content storage device(s) 240 represent stored content files including but not limited to, still photos (e.g., jpeg, gif, etc.), video clips, audio files, audio characteristics or parameters to synthesize an audio signal mimicking the voice associated with the picture that synchronizes the synthesized audio and movements of the head, mouth and eyes, or other application specific files. The content storage device(s) 240 can be implemented as RAM within the portable mobile communications device, a removable storage media (e.g., a Sony memory stick, compact flash, etc.) that can be inserted into and removed from the portable mobile communications device, an internal hard drive, reserved space on a SIM card, or the like.

The RF module 250 is responsible for sending and receiving RF signals to and from the mobile network. This includes both voice for telephone calls and data for SMS text messages. Other data RF transmissions are and can be handled by the RF module 250 but are outside the scope of this disclosure.

The output means 260 includes any mechanism that provides the user with a sensory perception. This can include, but is not limited to, a display for viewing graphics such as text and pictures, both still and in motion as well as speaker(s) for providing audible output. Vibrating alerts provide a tactile sensation that can also be considered output.

Other unspecified applications 270 are included in FIG. 2 that can be associated with the portable mobile communications device. A web-browser, for instance, may be a part of the portable mobile communications device suite of features. An incoming SMS message may ask the receiving user to "check out this web-site" and provide a link thereto.

Figure 3:
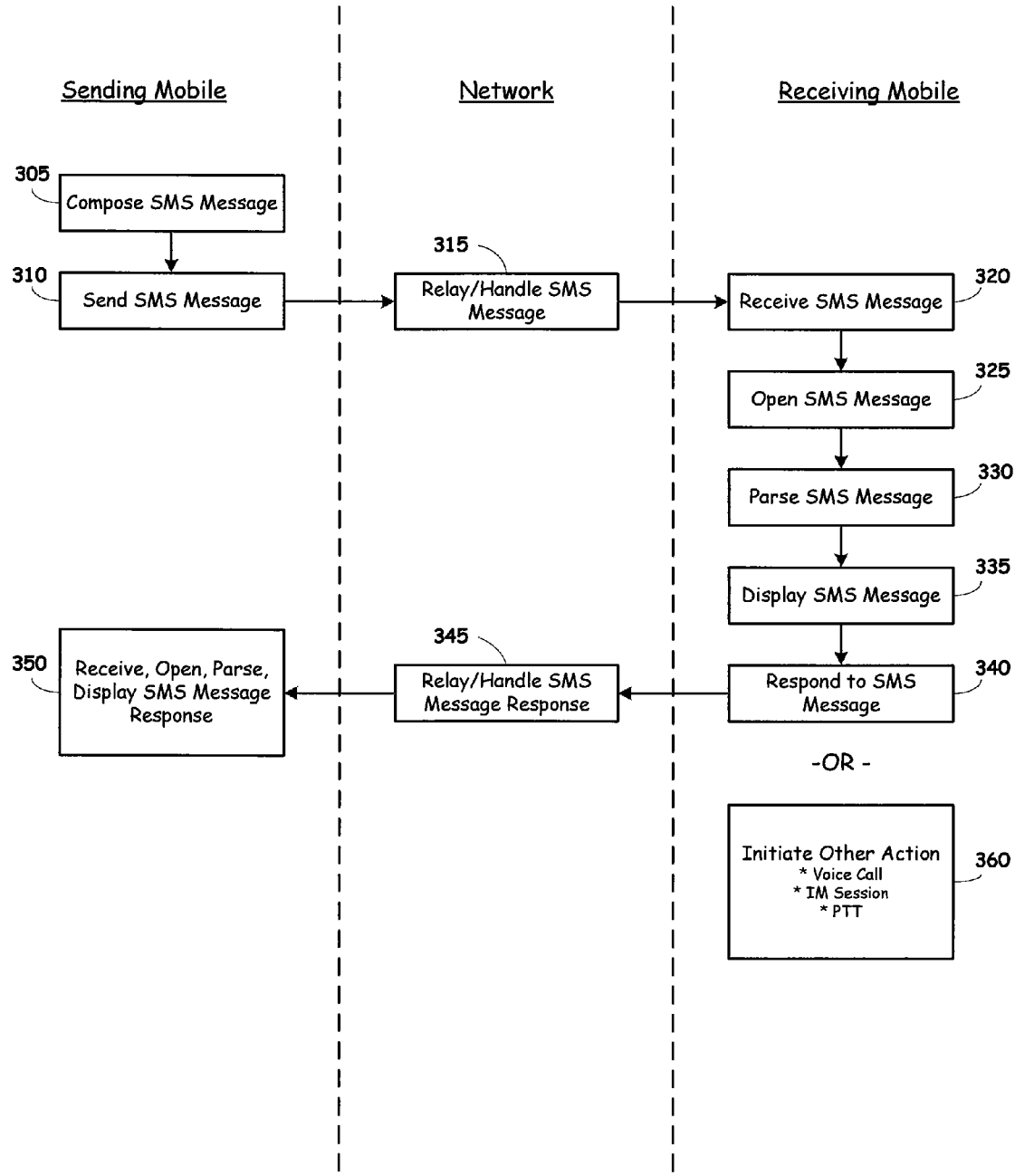
FIG. 3 is a logic diagram illustrating the flow of data involved in creating, sending, receiving, and displaying an animated SMS message between two portable mobile communications devices.

FIG. 3 is a logic diagram illustrating the flow of data involved in creating, sending, receiving, and displaying an animated SMS message between two portable mobile communications devices. FIG. 3 illustrates three entities, a sending portable mobile communications device, a receiving portable mobile communications device, and a mobile network in between. An SMS message is composed on the sending portable mobile communications device 305. The sub-process of composing the SMS message as well as a description of the contents of the SMS message are further described in FIGS. 4 and 5. The SMS message is then sent from the sending portable mobile communications device 310. The mobile network receives and handles the SMS message by relaying or routing it to the designated receiving portable mobile communications device 315. The receiving portable mobile communications device receives the SMS message from the mobile network 320. The SMS message can then be opened 325 and parsed 330 on the receiving portable mobile communications device. The sub-process of receiving and parsing the SMS message is further described in FIG. 6.

Once parsed 330, the SMS message can be displayed 335 by the receiving portable mobile communications device. The receiving portable mobile communications device then affords the user an opportunity to respond directly to the SMS message 340 if desired. Or, the user can initiate another activity (other than a direct response) based on the received SMS message 360. Such other activities include, but are not limited to, placing a voice call, starting an instant messaging (IM) session, initiating a push-to-talk over cellular (PoC) session, etc.

Figure 4:
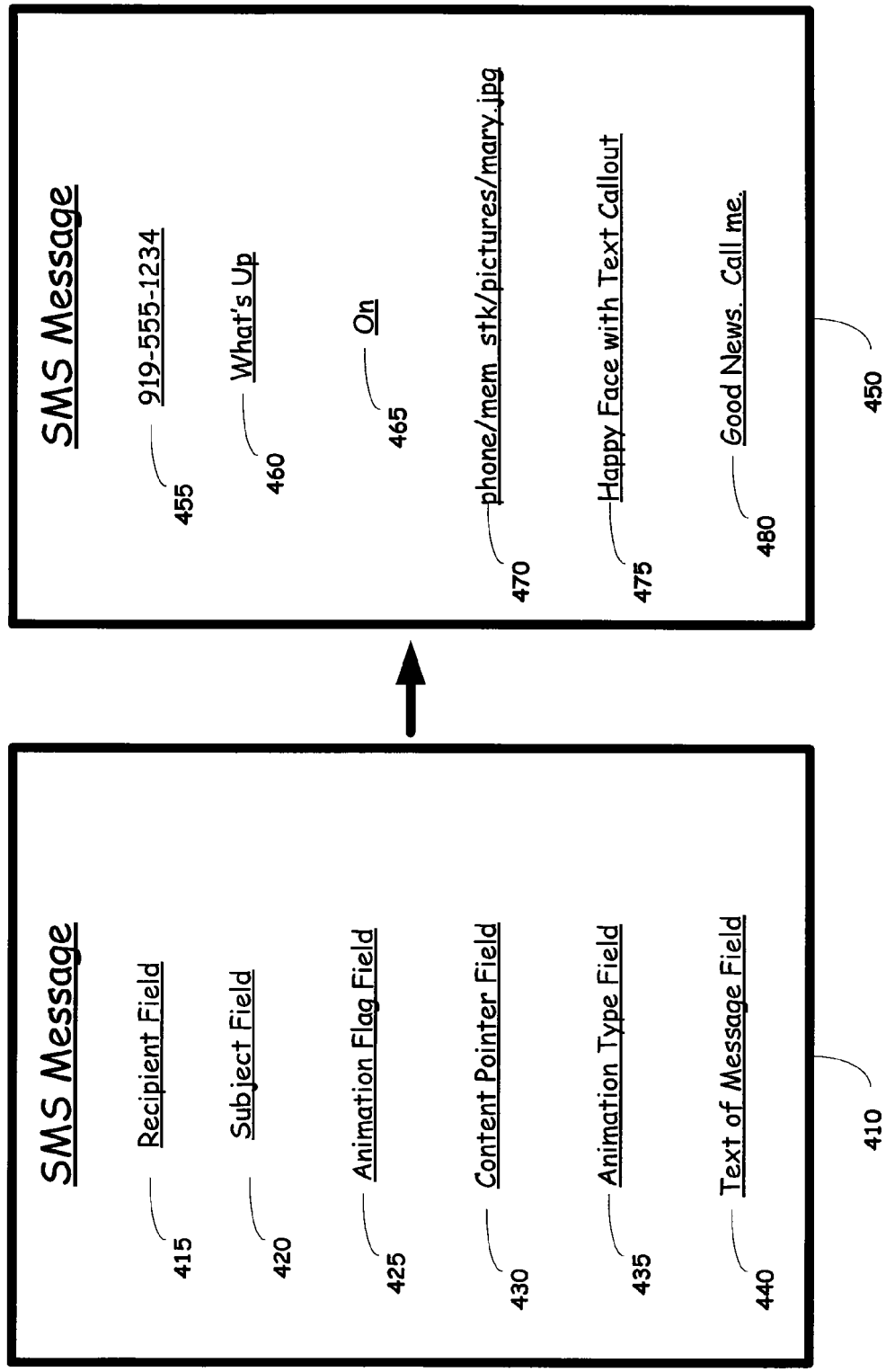
FIG. 4 is an illustration of an example of an SMS message showing message fields and sample data for the message fields.

FIG. 4 is an illustration of an example of an SMS message showing message fields and sample data for the message fields. A typical SMS message is comprised of three components: a destination mobile identifier (recipient field) 415, a subject field 420, and the text of the message (text of message field) 440. The present invention adds three additional fields to the SMS message 410: an animation flag field 425, a content pointer field 430, and an animation type field 435.

The recipient field 415 is comprised of one or more mobile identification numbers that indicate the recipients of the SMS message being composed. The subject field 420 is a field that allows the user to briefly introduce the SMS message to the recipient. The animation flag field 425 is a binary type field that indicates whether or not the current SMS message is to be associated with animation when the recipient views the SMS message. The content pointer field 430 contains a location on the receiving portable mobile communications device where a content file, such as a picture, to be associated with the incoming SMS message can be found. The animation type field 435 indicates the type of animation to be performed on the content file associated with the SMS message.

Animation types include, but are not limited to, facial expressions (happy, sad, mad, surprised, etc.), callout boxes for the text (or subject) of the SMS message, motion of the content file, special effects applied to the content file such as audio synchronization with an animated picture, and more.

One such animation technology has been developed by Sony Corporation and is termed MotionPortrait™. MotionPortrait™ generally operates as follows. At some time in the past, a picture of the head of a person to be animated has been taken by a camera and stored in the mobile phone. The processor in the mobile phone executes software (which could be part of the animation application) that identifies the location and outline of the head, the mouth, and the eyes. The picture with this information is stored. When the animation program is invoked, it substitutes eyes and mouth shapes into the picture so that the eyes can be made to look in various directions and the mouth can be made to look like it is speaking. Also, the head can be rotated in various directions in the image. The MotionPortrait™ program can also synchronize head, mouth and eye movements with audio or music. The program can also render a preconfigured animation associated with predefined audio phrases instead of building them from the SMS message, where the predefined audio phrase is simply selected by the SMS message.

Lastly, the text of message field 440 is a field that contains the actual textual content of the SMS message composed by the user.

The right side of FIG. 4 illustrates an SMS text message 450 with example data placed into the fields. A cellular telephone number 455 (in United States format) has been entered into the recipient field to identify the receiving portable mobile communications device. The subject field has been populated with the phrase "What's Up" 460. The animation flag has been set to 'on' 465. The content pointer field contains a memory storage address or location of "phone/mem_stk/pictures/mary.jpg" 470 to indicate that a picture of Mary (presumably the sender of the SMS message) will be associated with the SMS message.

The location shown is merely exemplary as it can be anywhere on the receiving portable mobile communications device. To facilitate usage of the animation feature, portable mobile communications devices that support the feature can designate a memory area to contain the content files. This way the sending user need not the location of the content file on the receiving portable mobile communications device, just the file name. Moreover, there can be a common set of content files supported by the animation feature such as emoticons, pictures of common places like a hospital, a church, home, etc. Users that are more familiar with one another may include more personalized content files (personal pictures, songs, etc.) that are known to one another.

The animation type field is set to 'happy face with text callout' 475 to indicate that the picture of Mary should be animated to have a facial expression that is considered happy with a comic like text call out box to indicate speech. The text of message field contains the input "Good News. Call Me." 480. This text will appear in the text call out box specified in the animation type field.

Figure 5:
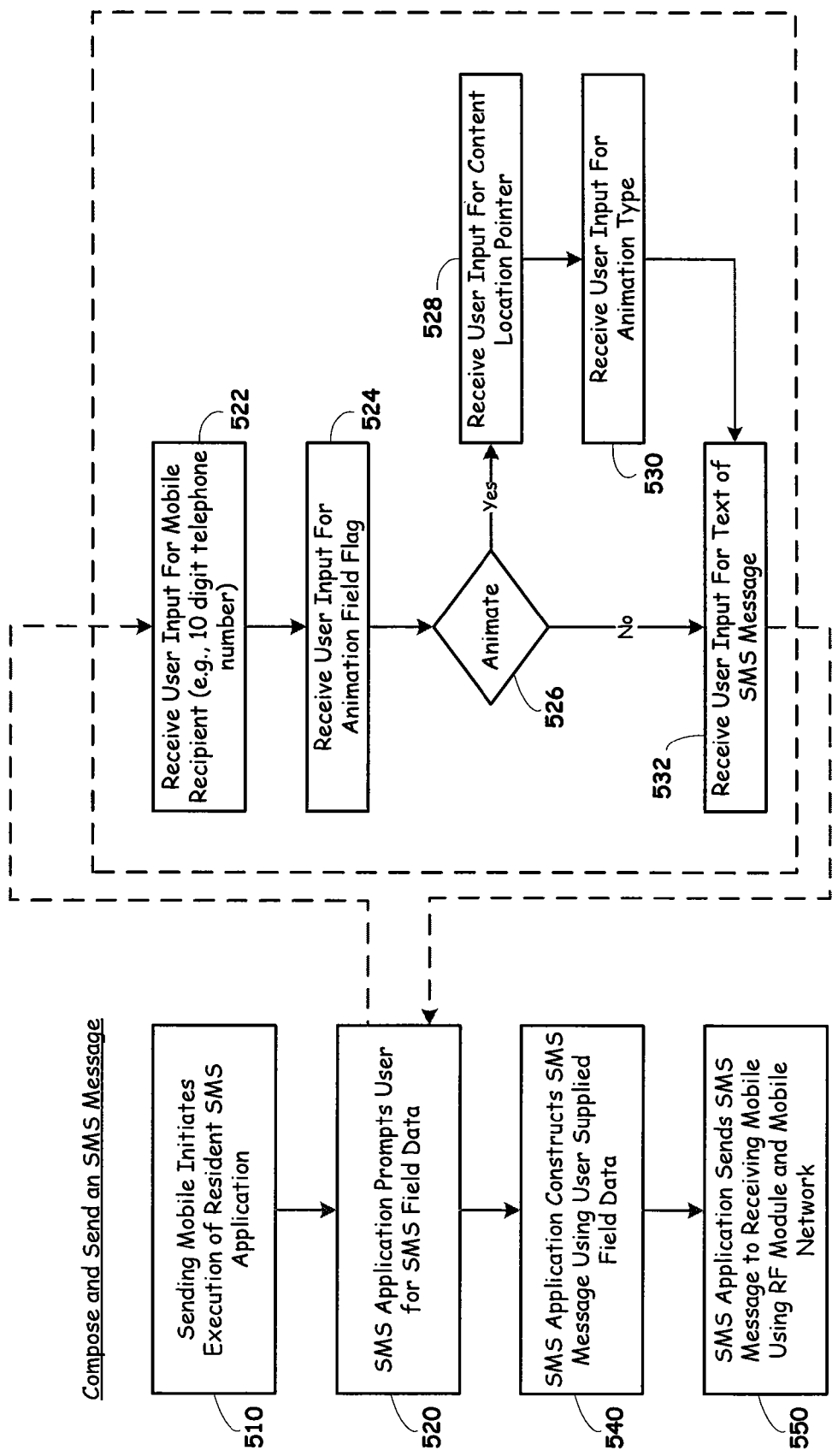
FIG. 5 is a flowchart detailing the process of composing and sending an SMS message in a portable mobile communications device.

FIG. 5 is a flowchart detailing the process of composing and sending an SMS message in a portable mobile communications device. The SMS application on the sending portable mobile communications device is initiated by the user 510. The SMS application then begins a series of prompts or queries requiring user input to be placed in the SMS fields 520.

The SMS application receives user input identifying the intended recipient portable mobile communications device 522. Using the United States as a reference, this entails a 10 digit mobile identification number which is more commonly known as the telephone number. The SMS application next prompts the user on how to set the animation flag 524. If the animation decision 526 is to animate the SMS message, the SMS application prompts the user for a location pointer 528 that indicates the location of a content file to be associated with SMS message.

Since the message is to remain an SMS message which carries a low overhead with respect to system resources and reduced user billing, the content file is not part of the SMS message. Rather, the content file is already on the receiving portable mobile communications device in a known or designated location. The sending portable mobile communications device user is responsible for knowing where the desired content file is located on the receiving portable mobile communications device. To assist in this, there can be a designated memory location common to all portable mobile communications devices that implement the SMS applications capable of animation. This location can be the repository of a known set of content files such as, for instance, emoticons. In addition, if the sending and receiving portable mobile communications device users are very familiar with one another, personal pictures of people, pets, places, etc. can be included in the designated area. Based on the familiarity, the sending portable mobile communications device user can identify a picture content file on the receiving portable mobile communications device with high confidence.

Animated or picture SMS messages can be created to identify locations as well as people. For instance, the sending portable mobile communications device could send an SMS message to a receiving portable mobile communications device with a text field that says "Meet me here at 10:00". The text can be associated with a picture of a specific restaurant that the users often frequent.

Once the content file location pointer has been input 528, the sending portable mobile communications device user can input an animation type parameter 530 that will cause the selected content file to be manipulated in a desired way when opened by the receiving device. The last component of the SMS message to be input is the actual text of the message 532. Depending on the animation type selected, the actual text can be converted to audio by the receiving device and output accordingly when the SMS message is opened, or it can remain as text and appear in a callout box associated with a picture file.

Once the sending portable mobile communications device user has supplied the input for the SMS message, the SMS application can construct the SMS message to be sent 540. Once constructed, the sending portable mobile communications device user can instruct the SMS application to send the SMS message 550 via the RF module over the mobile network to the receiving portable mobile communications device.

Figure 6:
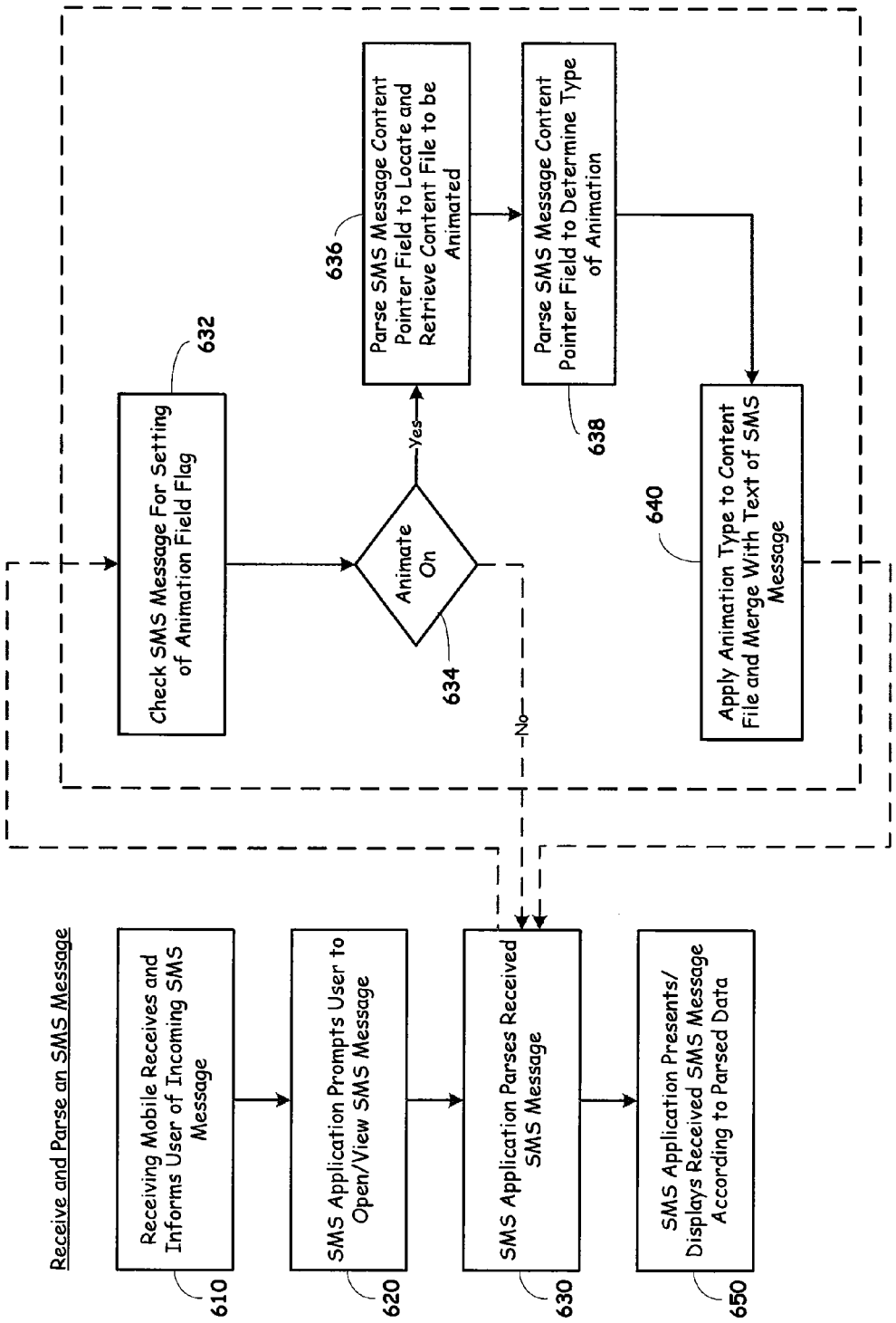
FIG. 6 is a flowchart detailing the process of receiving, parsing, and displaying an SMS message in a portable mobile communications device.

FIG. 6 is a flowchart detailing the process of receiving, parsing, and displaying an SMS message in a portable mobile communications device. The receiving portable mobile communications device receives an SMS message and informs its user via the SMS application of the event 610 with an alert of some sort. The SMS application prompts the user whether to open and view the received SMS message 620. Once the user instructs the SMS application to display the SMS message, the SMS application begins the SMS message parsing process 630. The first step in parsing the received SMS message is to check the animation field flag setting 632. If the animation field flag decision 634 indicates animation 'on', the parsing process proceeds in determining the content pointer location 636 and retrieving the content file at that location 636. The SMS application then parses the received SMS message to determine the type of animation to apply to the retrieved content file 638. The SMS application then applies the animation to the content file and merges the animated content file with the text contained in the text of message field 640. The SMS application then displays the received animated construction of the received SMS message 650.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the portable mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of creating a text based short message service (SMS) message, the method comprising:
   prompting a user to input data, into respective ones of a plurality of text- and/or character-only SMS fields, including:
      providing, in a first one of the SMS fields, a mobile identification number that identifies a receiving portable mobile communications device that is the intended recipient of the SMS message;
      setting, in a second one of the SMS fields, an animation flag that determines whether the SMS message will have animation characteristics applied to it by the receiving portable mobile communications device;
      providing, in a third one of the SMS fields, a content pointer location that specifies a particular location of a content file, resident on the receiving portable mobile communications device, to be associated with the SMS message;
      providing, in a fourth one of the SMS fields, text and/or characters to be associated with the SMS message;
   constructing the SMS message using the input data from the first, second, third, and fourth SMS fields; and
   prompting the user to input data providing an animation type parameter that specifies how the content file associated with the SMS message will be animated.

2. The method of claim 1, where the animation type includes facial expression animation.

3. The method of claim 1, where the animation type includes synchronizing an audio file with a picture file.

4. The method of claim 1, where the content file is a picture.

5. The method of claim 1, where the content file is an emoticon.

6. The method of claim 1, where the content file is an audio file.

7. The method of claim 1, where the SMS message is sent from a sending portable mobile communications device to a receiving portable mobile communications device over a mobile network.

8. The method of claim 1, where the SMS message is sent from a computer device to a receiving portable mobile communications device over an Internet Protocol (IP) network that is communicable with a mobile network.

9. In a portable communication device, a method of displaying a text based short message service (SMS) message including a plurality of text- and/or character-only SMS fields, the method comprising:
   receiving, based on a mobile identification number in a first one of the SMS fields, the SMS message via a mobile network;
   parsing a second one of the SMS fields, including an animation flag, to determine how to apply particular animation characteristics to the SMS message;
   parsing a third one of the SMS fields, including a content pointer location, to locate and retrieve a particular content file, from a memory of the communication device, associated with the SMS message;
   parsing a fourth one of the SMS fields to determine text and/or characters associated with the SMS message;
   displaying, based on the second, third, and fourth SMS fields, the text and/or characters, along with the particular animation characteristics, associated with the SMS message;
   determining an animation type to be applied to the particular content file; and
   applying the animation type to the displayed text and/or characters associated with the SMS message.

10. The method of claim 9, where the animation type includes facial expression animation.

11. The method of claim 9, where the animation type includes synchronizing an audio file with a picture file.

12. The method of claim 9, where the content file is a picture.

13. The method of claim 9, where the content file is an emoticon.

14. The method of claim 9, where the content file is an audio file.

15. A computer program product embodied in a memory device which, when executed by a computer, causes the computer to perform a method for creating a text based short message service (SMS) message, the computer program product comprising:
   computer program code for prompting a user to input data, into respective ones of a plurality of text- and/or character-only SMS fields, including:
      computer program code for providing, in a first one of the SMS fields, a mobile identification number that identifies a receiving portable mobile communications device that is the intended recipient of the SMS message;
      computer program code for setting, in a second one of the SMS fields, an animation flag that determines whether the SMS message will have animation characteristics applied to it by the receiving portable mobile communications device;
      computer program code for providing, in a third one of the SMS fields, a content pointer location that specifies a particular location of a content file resident on the receiving portable mobile communications device, to be associated with the SMS message;
      computer program code for providing, in a fourth one of the SMS fields, text and/or characters to be associated with the SMS message;
   computer program code for constructing the SMS message using the input data from the first, second, third, and fourth SMS fields; and computer program code for prompting the user to input data to provide an animation type parameter that specifies how the content file associated with the SMS message will be animated.

16. The computer program product of claim 15, where the animation type includes facial expression animation.

17. The computer program product of claim 15, where the animation type includes synchronizing an audio file with a picture file.

18. The computer program product of claim 15, where the content file is a picture.

19. The computer program product of claim 15, where the content file is an emoticon.

20. The computer program product of claim 15, where the content file is an audio file.

21. The computer program product of claim 15, where the SMS message is sent from a sending portable mobile communications device to a receiving portable mobile communications device over a mobile network.

22. The computer program product of claim 15, where the SMS message is sent from a computer device to a receiving portable mobile communications device over an Internet Protocol (IP) network that is communicable with a mobile network.

23. A computer program product embodied in a memory device which, when executed by a computer, causes the computer to perform a method for displaying, on a portable mobile communications device, a text based short message service (SMS) message including a plurality of text- and/or character-only SMS fields, the computer program product comprising:

computer program code for receiving, based on a mobile identification number in a first one of the SMS fields, the SMS message via a mobile network;

computer program code for parsing a second one of the SMS fields, including an animation flag, to determine how to apply particular animation characteristics to the SMS message;

computer program code for parsing a third one of the SMS fields, including a content pointer location, to locate and retrieve a particular content file, from a memory of the communication device, associated with the SMS message;

computer program code for parsing a fourth one of the SMS fields to determine text and/or characters associated with the SMS message;

computer program code for displaying, based on the second, third, and fourth SMS fields, the text and/or characters, along with the particular animation characteristics, associated with the SMS message;

computer program code for determining an animation type to be applied to the particular content file; and computer program code for applying the displayed text and/or characters associated with the SMS message.

24. The computer program product of claim 23, where the animation type includes facial expression animation.

25. The computer program product of claim 23, where the animation type includes synchronizing an audio file with a picture file.

26. The computer program product of claim 23, where the content file is a picture.

27. The computer program product of claim 23, where the content file is an emoticon.

28. The computer program product of claim 23, where the content file is an audio file.

29. A communication device including a short message service (SMS) message application, comprising:

means for prompting a user to input data, into respective ones of a plurality of text- and/or character-only SMS fields of an outgoing SMS message, including:

providing, in a first one of the SMS fields of the outgoing SMS message, a mobile identification number that identifies a receiving portable mobile communications device that is the intended recipient of the outgoing SMS message, setting, in a second one of the SMS fields of the outgoing SMS message, an animation flag that determines whether the outgoing SMS message will have animation characteristics applied to it by the receiving portable mobile communications device, providing, in a third one of the SMS fields of the outgoing SMS message, a content pointer location that specifies a particular location of a content file, resident on the receiving portable mobile communications device, to be associated with the outgoing SMS message, providing, in a fourth one of the SMS fields of the outgoing SMS message, text and/or characters to be associated with the outgoing SMS message, means for prompting the user to input data providing an animation type parameter that specifies how the content file associated with the SMS message will be animated;

means for constructing the outgoing SMS message using the input data from the first, second, third, and fourth SMS fields and the animation type parameter;

means for transmitting the outgoing SMS message via a mobile network;

means for receiving, based on a mobile identification number in a first one of a plurality of SMS fields in an incoming SMS message, the incoming SMS message via a mobile network;

means for parsing a second one of the SMS fields of the incoming SMS message, including an animation flag, to determine how to apply particular animation characteristics to the incoming SMS message;

means for parsing a third one of the SMS fields of the incoming SMS message, including a content pointer location, to locate and retrieve a particular content file, from a memory of the communication device, associated with the incoming SMS message;

means for parsing a fourth one of the SMS fields of the incoming SMS message to determine text and/or characters associated with the incoming SMS message; and means for displaying, based on the second, third, and fourth SMS fields of the incoming SMS message, the text and/or characters, along with the animation type parameter and the particular animation characteristics, associated with the incoming SMS message.

* * * * *